United States Patent Office 2,890,180
Patented June 9, 1959

2,890,180

ANION EXCHANGERS FROM POLYVINYL ALCOHOL, THIOUREA AND FORMALDEHYDE

Jiří Černý and Otto Wichterle, Prague, Czechoslovakia

No Drawing. Application May 21, 1956
Serial No. 585,927

Claims priority, application Czechoslovakia May 20, 1955

4 Claims. (Cl. 260—2.1)

This invention relates to a process for producing anion exchangers on the basis of thiuronium salts.

It is known that primary alcohols are able to react with thiourea in acid media forming thiuronium salts. This led to the idea of producing anion exchangers on the basis of polyvinylalcohol thiuronium salts according to the present invention. The starting components for the synthesis of this annex is the macromolecular compound polyvinylalcohol containing in its linear chain secondary alcoholic groups which due to their hydrophylic properties grant it the capability of dissolving in aqueous solutions.

We have found that by the reaction of the polyvinylalcohol hydroxyl groups with thiourea, which reacts like isothiourea, polyvinylalcohol thiuronium chloride is formed in hydrochloride acid medium according to the scheme

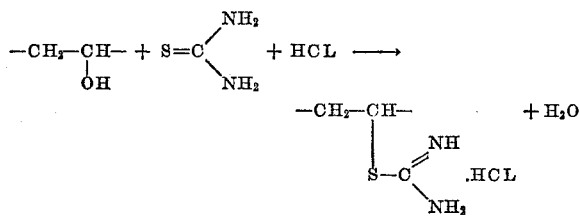

In this polyvinylalcohol thiuronium salt the chlorine is by an electrovalency linked to the thiuronium group as anion. That a macromolecular secondary alcohol like polyvinylalcohol reacts in the mentioned sense appears most surprising.

Furthermore we have discovered that the water soluble product formed by the reaction of polyvinylalcohol with thiourea can be used as annex in the exchange of anions. For producing an annex applicable in technical practice it is first of all necessary to suppress the solubility of the polythiuronium salt in water, as the ionogenic thiuronium groups of the polyvinylalcohol thiuronium chloride are responsible for the increased solubility of this macromolecular compound in water.

We have further discovered that the insolubility of the said salt can be achieved particularly when hardening it by means of formaldehyde. We ascertained that by the reaction of polyvinylalcohol thiuronium chloride with formaldehyde in aqueous solution, this reaction taking place between the free amino groups of the thiuronium group and the formaldehyde with elimination of water, cross links are formed by methylene bridges

between the single chains. This netting of the molecules by means of formaldehyde leads to an anion exchanger insoluble in water and representing a solid with limited swelling capacity and satisfactory strength of its granules. The hardening of the polythiuronium salts with formaldehyde brings about, however, a decrease of its original exchanging capacity of 4.42 meq. u./gram (equal to 32 percent of the highest achievable substitution of the polyvinylalcohol hydroxyl groups by thiourea) to a capacity which for an annex showing optimal properties amounts to 3.22 meq. u./gram.

*Example*

A 250 ccm. flask with a fitted reflux condenser was charged with 4.41 grams polyvinylalcohol (saponification value =25.96; K=55), 7.61 grams thiourea and 25 ccm. hydrochloric acid of a concentration of 37 percent. The components were stirred until a viscous clear solution was formed. This solution was then refluxed at a temperature of 125° C. for 25 hours. In the obtained brownish clear solution of the polyvinylalcohol thiuronium salt 32 percent of the polyvinylalcohol hydroxyl groups were replaced by thiourea. This equals an exchanging capacity of 4.42 meq. u./gram. 30 grams of a 30 percent formaldehyde solution were then added and after stirring the mixture was heated to 80° C. for 60 hours. In the reaction mixture a brownish gel-like substance was formed which was reduced to grains whilst wet and washed with distilled water until no further chlorine ions appeared in the filtrate (checked with a 5 percent silver nitrate solution). The gel thus washed was dried at 60° C. until its weight was stable. The obtained 6.5 grams of brown granules were reduced to a particle size smaller than 0.1 mm. and their exchanging capacity was tested as described hereafter.

The method used for the determination of the exchanging capacity of the annex was based on the displacement of the chlorine ions contained in the annex by the sulphate ions of a 1 n sodium sulphate solution and on the determination of the chlorine ions by titration.

A filter cup $G_3$ was charged with 1,000 grams of the dried annex having a particle size smaller than 0.1 mm. and 50 ccm. of a 1 n sodium sulphate solution were passed through by drops. The filtrate was collected in a 400 ccm. beaker. The annex from the filter cup was then washed with 250 ccm. distilled water which was collected in the same beaker. In the solution collected in the beaker the free chlorine ions were determined by titration with a 0.1 n mercury nitrate solution. 32.2 ccm. of this $Hg(NO_3)_2$ solution were needed for the titration. The exchanging capacity of the annex thus determined and amounting to 3.22 meq. u./gram proved unchanged in four subsequent tests. A 1 n sodium chloride solution (50 ccm.) was used as regenerator and after washing with distilled water the described method was applied again.

We claim:

1. A process for producing anion exchangers on the basis of thiuronium salts, comprising treating a polyvinyl alcohol solution with thiourea in a hydrochloric acid medium at elevated temperatures not exceeding 150° C., using thiourea and polyvinyl alcohol in a ratio of at least 0.5:1 by weight, adding upon completion of the reaction of the mixture a formaldehyde solution, using formaldehyde and polyvinyl alcohol in a ratio of at least 0.3:1 by weight, further heating until a gel-like water insoluble mass is formed, reducing the mass obtained to grains, washing the grains with water until the acid-forming ions are removed, and drying the grains until a uniform weight is reached.

2. A process for producing anion exchangers on the basis of thiuronium salts, comprising treating a polyvinyl alcohol solution with thiourea in a hydrochloric acid medium at a temperature between 80 and 130° C. for a period of 20 to 30 hours, adding upon completion of the reaction of the mixture a 30 percent formaldehyde solution, further heating to temperatures between 60 and 90° C. for a period of 1 to 3 days until a gel-like water insoluble mass is formed, reducing the mass obtained to grains, washing the grains with water until the acid-forming ions are removed, and drying the grains at a temperature between 50 to 90° C. until a uniform weight is reached.

3. A process for producing anion exchangers on the basis of thiuronium salts, comprising refluxing a polyvinyl alcohol solution with thiourea in a hydrochloric acid medium at a temperature between 80 and 130° C. for a period of 20 to 30 hours, adding upon completion of the reaction of the mixture a 30 percent formaldehyde solution, further heating to temperatures between 60 and 90° C. for a period of 1 to 3 days until a gel-like water insoluble mass is formed, reducing the mass obtained to grains, washing the grains with water until the acid-forming ions are removed, and drying the grains at a temperature between 50 to 90° C. until a uniform weight is reached.

4. In the process according to claim 1, using thiourea and polyvinyl alcohol in a ratio of 1.7:1 by weight.

References Cited in the file of this patent

Nakajo: Japan 540 (52), abstracted in C.A. 47, 6185 (1953); copy of C.A. in Library.

Nakamura: J. Chem. Soc. Japan, Ind. Sec., 58, 269–273 (April 1955), abstracted in C.A. 49, 14376, 14377 (1955).